US010413858B2

(12) United States Patent
Mu et al.

(10) Patent No.: US 10,413,858 B2
(45) Date of Patent: Sep. 17, 2019

(54) METAL-ORGANIC FRAMEWORK-BASED SORBENTS AND METHODS OF SYNTHESIS THEREOF

(71) Applicant: ARIZONA BOARD OF REGENTS ON BEHALF OF ARIZONA STATE UNIVERSITY, Scottsdale, AZ (US)

(72) Inventors: Bin Mu, Tempe, AZ (US); Mitchell Armstrong, Tempe, AZ (US); Allen Wright, Gilbert, AZ (US); Klaus Lackner, Paradise Valley, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 412 days.

(21) Appl. No.: 15/392,466

(22) Filed: Dec. 28, 2016

(65) Prior Publication Data
US 2017/0182453 A1 Jun. 29, 2017

Related U.S. Application Data

(60) Provisional application No. 62/271,605, filed on Dec. 28, 2015.

(51) Int. Cl.
*B01D 53/02* (2006.01)
*B01D 53/04* (2006.01)
(Continued)

(52) U.S. Cl.
CPC ......... *B01D 53/0454* (2013.01); *B01D 53/04* (2013.01); *B01J 20/08* (2013.01);
(Continued)

(58) Field of Classification Search
CPC ........ B01D 2253/204; B01D 2253/306; B01D 2257/504; B01D 2259/40083;
(Continued)

(56) References Cited

U.S. PATENT DOCUMENTS 8,273,160 B2 9/2012 Wright et al.
8,728,218 B2 * 5/2014 Knapp ................ B01J 20/3007
96/154
(Continued)

FOREIGN PATENT DOCUMENTS

WO 2016/164781 A1 10/2016

OTHER PUBLICATIONS

M Bechelany et al., "Highly crystalline MOF-based materials grown on electrospun nanofibers", Nanoscale, 7, pp. 5794-5802, 2015.
(Continued)

*Primary Examiner* — Christopher P Jones
(74) *Attorney, Agent, or Firm* — Fish & Richardson P.C.

(57) ABSTRACT

A carbon dioxide capture and release method of forming a MOF matrix material including at least one metal-organic-framework crystal that includes at least one metal ion or metal ion cluster coordinated to polydentate organic ligands. The method includes forming a positive moisture swing $CO_2$ host by application of at least a portion of the MOF matrix material to at least a portion of a good, and exposing the good to a feed gas. The method also includes altering the absorption and desorption of $CO_2$ in the $CO_2$ host through a swing absorption/desorption process of moisture content, where an equilibrium pressure of $CO_2$ over the $CO_2$ host is based at least in part on the moisture content. The metal-organic-framework crystal can be UIO-66 including $Zr_6O_4(OH)_4(CO_2)_{12}$ clusters linked by terephthalate acid ligands, and/or $Zr_6O_4(OH)_4(CO_2)_{12}$ clusters linked by amino-terephthalic acid ligands, and/or $Zr_6O_4(OH)_4(CO_2)_{12}$ clusters linked by nitro-terephthalic acid ligands.

19 Claims, 13 Drawing Sheets terephthalic acid (51) Int. Cl.
  B01J 20/22 (2006.01)
  B01J 20/08 (2006.01)
  B01J 20/28 (2006.01)
  B01J 20/34 (2006.01)

(52) U.S. Cl.
  CPC ....... B01J 20/226 (2013.01); B01J 20/28016 (2013.01); B01J 20/3425 (2013.01); B01J 20/3458 (2013.01); *B01D 2253/204* (2013.01); *B01D 2253/306* (2013.01); *B01D 2257/504* (2013.01); *B01D 2259/40083* (2013.01)

(58) Field of Classification Search
  CPC ...... B01D 53/04; B01D 53/0454; B01J 20/08; B01J 20/226; B01J 20/28016; B01J 20/3425; B01J 20/3458
  See application file for complete search history.

(56) References Cited

U.S. PATENT DOCUMENTS

| | | | | |
|---|---|---|---|---|
| 8,900,347 | B2* | 12/2014 | Boulet | B01D 53/0462 95/114 |
| 8,974,576 | B2* | 3/2015 | Gupta | B01D 53/06 95/139 |
| 9,283,510 | B2 | 3/2016 | Lackner et al. | |
| 2009/0211441 | A1* | 8/2009 | Reyes | B01D 53/02 95/96 |
| 2011/0088549 | A1* | 4/2011 | Sayari | B01D 53/02 95/96 |
| 2011/0203174 | A1 | 8/2011 | Lackner et al. | |
| 2013/0298769 | A1* | 11/2013 | Petruska | B01D 53/02 95/139 |
| 2014/0174291 | A1* | 6/2014 | Gupta | B01D 53/06 95/96 |
| 2015/0047505 | A1* | 2/2015 | Schroder | B01J 20/226 95/129 |
| 2015/0158013 | A1* | 6/2015 | Eddaoudi | B01J 20/226 95/139 |
| 2015/0246340 | A1* | 9/2015 | Zaworotko | B01J 20/226 95/127 |

OTHER PUBLICATIONS

MJ Cliffe et al., "Correlated defect nanoregions in a metal-organic framework", Nature Communictions 5:4176, 2014.

Z Liang et al., "CO2 Adsorption-Based Separation by Metal Organic Framework (Cu-BTC) versus Zeolite (13X)", Energy & Fuels, 23, pp. 2785-2789, 2009.

Y Liu et al., "Recent advances in carbon dioxide capture with metal-organic frameworks", Greenhouse Gas Sci Technol., 2:239-259, 2012.

TM McDonald et al., "Capture of Carbon Dioxide from Air and Flue Gas in the Alkylamine-Appended Metal-Organic Framework mmen-Mg2(dobpdc)", J.Am. Chem. Soc., 134, pp. 7056-7065, 2012.

ES Sanz-Perrez et al., "Direct Capture of CO2 from Ambient Air", Chem. Rev., 116, pp. 11840-11876, 2016.

S Seth et al., "Carbon Dioxide Capture by a Metal-Organic Framework with Nitrogen-Rich Channels Based on Rationally Designed Triazole-Functionalized Tetraacid Organic Linker", Inorg. Chem., 54, pp. 6829-6835, 2015.

JM Simmons et al., "Carbon capture in metal-organic frameworks—a comparative study", Energy Environ. Sci., 4, pp. 2177-2185, 2011.

JM Simmons et al., "Carbon capture in metal-organic frameworks—a comparative study", Supplementary Material (ESI) for Energy & Environmental Science, 2011.

K Sumida et al., "Carbon Dioxide Capture in Metal Organic Frameworks", Chem. Rev., 112, pp. 724-781, 2012.

KS Walton et al., "Understanding Inflections and Steps in Carbon Dioxide Adsorption Isotherms in Metal-Organic Frameworks", J. Am. Chem. Soc., 130, pp. 406-407, 2008.

T Wang et al., "Moisture Swing Sorbent for Carbon Dioxide Capture from Ambient Air", Environ. Sci. Technol., 45, pp. 6670-6675, 2011.

B Wu et al., "Oriented Mof-polymer Composite Nanofiber Membranes for High Proton Conductivity at High Temperature and Anhydrous Condition", Scientific Reports, 4 : 4334, 2014.

JA Wurzbacher et al., "Concurrent Separation of CO2 and H2O from Air by a Temperature-Vacuum Swing Adsorption/Desorption Cycle", Environ. Sci. Technol. 2012, 46, 9191-9198, 2012.

S Xiang et al., "Microporous metal-organic framework with potential for carbon dioxide capture at ambient conditions", Nature Communication, 3:954, 2012.

Z Yuan et al., "Toward the Development and Deployment of Large-Scale Carbon Dioxide Capture and Conversion Processes", Ind. Eng. Chem. Res., 55, pp. 3383-3419, 2016.

Lackner, Klaus S., Sarah Brennan, Jurg M. Matter, A-H. Alissa Park, Allen Wright, and Bob Van Der Zwaan. "The urgency of the development of CO2 capture from ambient air." Proceedings of the National Academy of Sciences 109, No. 33 (2012): 13156-13162.

Wang, Tao, Klaus S. Lackner, and Allen B. Wright. "Moisture-swing sorption for carbon dioxide capture from ambient air: a thermodynamic analysis." Physical Chemistry Chemical Physics 15, No. 2 (2013): 504-514.

* cited by examiner

METAL-ORGANIC FRAMEWORK-BASED SORBENTS AND METHODS OF SYNTHESIS THEREOF

RELATED APPLICATIONS

This application claims priority to U.S. provisional application Ser. No. 62/271,605, filed on Dec. 28, 2015, the entire contents of which are incorporated herein by reference.

BACKGROUND

Moisture swing sorption is a novel sorbent cycle technology that uses water rather than heat or pressure to modify the loading of sorbent. Previously, moisture swing behavior has previously been shown in certain anionic exchange resins that have quaternary ammonium ions as a fixed positive charge, and can use hydroxides, carbonate or bicarbonate ions as a negative charge. For a material to have a moisture swing, two characteristics are important. First, the material needs to have the capacity to absorb $CO_2$ from a gas, and second, the affinity to $CO_2$ should be reduced by the presence of water vapor (thereby allowing selective and controllable $CO_2$ capture and release). Many materials have the opposite of this type of moisture swing, whereby the affinity to $CO_2$ is increased by reducing the water content.

Metal organic frameworks (MOF) materials comprising metal ions or metal ion clusters coordinated to polydentate organic ligands have some of the highest pore volume, surface area, and lowest densities known. Consequently, MOFS have been extensively studied for a myriad of applications such as sensing, catalysis, separations, and gas storage. Of the tens of thousands of known MOF materials, particularly stable transition metal-based MOFS such as Zirconium based MOFs (ZrMOF), including UiO-66 (also called Zr-BDC) are becoming more popular due in part to their superior stability relative to MOFs based on other metals. Other exceptionally stable MOF materials of interest include chromium (III) terephthalate (MIL-101), which possesses notable stability and resistance to leaching of metal ions in organic and aqueous solvents and at high temperatures. These materials could offer the potential for use in gas storage and separation under real-world use conditions that include a positive moisture swing mechanism.

SUMMARY

A carbon dioxide capture and release method comprising forming a MOF matrix material including at least one metal-organic-framework crystal that comprises at least one metal ion or metal ion cluster coordinated to polydentate organic ligands. Further, the method includes forming a positive moisture swing $CO_2$ host by application of at least a portion of the MOF matrix material to at least a portion of a good, and exposing the good to a feed gas. The method includes altering the absorption and desorption of $CO_2$ in the $CO_2$ host through a swing absorption/desorption process of moisture content, where an equilibrium pressure of $CO_2$ over the $CO_2$ host is based at least in part on the moisture content.

In some embodiments, the feed gas is ambient air. In some embodiments, the swing absorption/desorption process comprises altering the moisture content of the $CO_2$ host. In some embodiments, the moisture content is altered based on a moisture content of the feed gas. In some embodiments of the invention, the positive moisture swing comprises an increase in moisture in the $CO_2$ host and a related increase in $CO_2$ absorption by the $CO_2$ host.

In some embodiments of the invention, the at least one metal-organic-framework crystal comprises UIO-66. In some embodiments, the UIO-66 comprises $Zr_6O_4(OH)_4(CO2)_{12}$ clusters linked by terephthalate acid ligands. In some embodiments, the UIO-66 comprises $Zr_6O_4(OH)_4(CO2)_{12}$ clusters linked by amino-terephthalic acid ligands. In some embodiments, the UIO-66 comprises $Zr_6O_4(OH)_4(CO2)_{12}$ clusters linked by nitro-terephthalic acid ligands.

In some further embodiments, the polydentate organic ligand includes terephthalate acid, and/or amino-terephthalic acid, and/or nitro-terephthalic acid. In some further embodiments, the MOF comprises chromium (III) terephthalate. In other embodiments, the MOF comprises a zeolitic imidazolate framework comprising ZIF-8.

In some embodiments of the invention, the good comprises glass, glass-ceramic, or ceramic oxide bead or particle. In some further embodiments, the ceramic oxide is alumina. In other embodiments, the good comprises a gas separation or storage tube or cylinder. In some embodiments, the gas separation or storage tube or cylinder includes the MOF matrix material. In some other embodiments, the application comprises depositing MOF matrix material on or in at least a portion of the good.

In some embodiments, the MOF matrix material is formed from a mixture of $ZrCl_4$ and terephthalic acid in dimethylformamide and acetic acid heated to 120° C. for 24 hours. In some further embodiments, the equilibrium pressure of $CO_2$ is based on the polydentate organic ligand. In some embodiments, the polydentate organic ligand includes terephthalate acid, and at least one of amino-terephthalic acid, and nitro-terephthalic acid, and the equilibrium pressure of $CO_2$ over the $CO_2$ host is based on the relative proportions of terephthalate acid, amino-terephthalic acid, and nitro-terephthalic acid.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

MOFs as a new class of materials can be used to capture $CO_2$ from air in dry conditions and release $CO_2$ in wet conditions by a moisture swing behavior. Flexibility in design and synthesis of MOF structures makes it possible to deploy environmental-friendly, economic-effective materials that offer significant design flexibility. For example, MOFs are known to be highly modifiable, and therefore can be tailored a specific device, apparatus or system.

In certain embodiments, the invention includes materials and methods related to any MOF materials, wherein the MOF material includes one or more metal ions or metal ion clusters comprising a metal atom of group 4 or 6. For example, in some embodiments, the invention relates to any MOF matrices including metal ions comprising Zirconium and/or Chromium. In some other embodiments, the invention relates to any MOF matrices, wherein the metal ion or cluster comprises a metal atom of groups 3, 5, and/or 7-12. In some embodiments, different ligands such as terephthalic acid, amino-terephthalic acid, and nitro-terephthalic acid can be used to increase positive moisture swing behavior.

In some embodiments of the invention, any of the MOF materials described herein can be integrated with an article of manufacture such as a commercially sold and distributed good. The good can be any useful article that can be deployed for selective capture and release of $CO_2$ or other gases. The good can be an individual feature, article, device, material, kit, or system, and/or methods, or combinations thereof that include any one of the MOF materials described herein. In addition, any combination of two or more such individual features, articles, devices, materials, kits, or systems and/or methods, if such individual features, articles, devices, materials, kits, or systems are not mutually inconsistent, is included within the scope of the invention. For example, in one non-limiting example embodiment, the good can comprise granules or pellets of materials used for $CO_2$ capture or release. In some embodiments, the MOF materials can be used with along or in combination with other materials. In some other embodiments, the good can include any article of manufacture that includes any one or more of the aforementioned MOF materials integrated with or applied within another article of manufacture that is used to selective store and release $CO_2$. For example, in some embodiments, any of the MOF materials described herein can be applied to a base material (e.g., such as a granule, particle, or pellet) that can provide mechanical support for transport and use in an apparatus for selective capture and release of $CO_2$.

Some embodiments include a method of forming a good for selective storing and releasing of $CO_2$. For example, some embodiments include forming a MOF matrix including one or more of the metal-organic-framework crystal materials described here, and contacting, coating or integrating the MOF matrix with the good. In this instance, the MOF matrix can include the at least one metal-organic-framework crystal material comprising at least one metal ion or metal ion cluster coordinated to at least one polydentate organic ligand. The method can include contacting, coating or integrating the MOF matrix with at least a portion of the good. For instance, in some embodiments, in some embodiments, any of the MOF materials described herein can be applied to an inert base substrate such as a glass, glass-ceramic, or ceramic oxide bead or particle (such as $Al_2O_3$) and used within one or more gas separation or storage tubes or cylinders.

The MOF materials described herein can be tested for moisture swing using a two-step process. First, the material is tested for its ability to bind and release a gas such as $CO_2$. The material is then exposed to increased levels of moisture and monitored for the release of $CO_2$. Since the MOF materials are intended as collectors of $CO_2$ from air, where the concentration is of $CO_2$ is relatively low, the testing can use low concentrations of $CO_2$ (~400 ppm) when detecting moisture swing behavior.

The apparatus used to study the behavior of candidate MOF materials can utilize a small closed gas loop where a finite volume of gas circulates through a reaction chamber, a humidistat and a $CO_2$ and water vapor detector. The humidistat consists of a simple Peltier element that can warm or cool a small chamber that contains moisture. When heated, some of the water vapor in the chamber enters the gas flowing through it and thus raises its humidity. When cooled, the chamber will condense some of the water drying the gas circulating in the test volume. After the gas exits the humidistat, it can be heated to a fixed temperature of about 52° C. as it flows through an infrared gas analyzer. The sample chamber is thermally isolated from the temperature fluctuations inside the Peltier element. Further, a water vapor reading from the gas analyzer is used to adjust the humidity in the gas volume to a desired value. The presence of a moisture swing within a sample can be tested in the chamber as the $CO_2$ stabilizes at one level of moisture, e.g., a low level. The water vapor concentration in the gas can be raised, and the sample can be monitored for $CO_2$ release until the $CO_2$ concentration in the chamber is in equilibrium with the loading state on the sorbent. A moisture swing can be manifested by the response of the system to a change in moisture. The fact that $CO_2$ can be released with increased moisture demonstrates the sorbents $CO_2$ capacity, and the fact that the equilibrium pressure over the sorbent is moisture dependent establishes the moisture swing property of the material.

Figure 1:
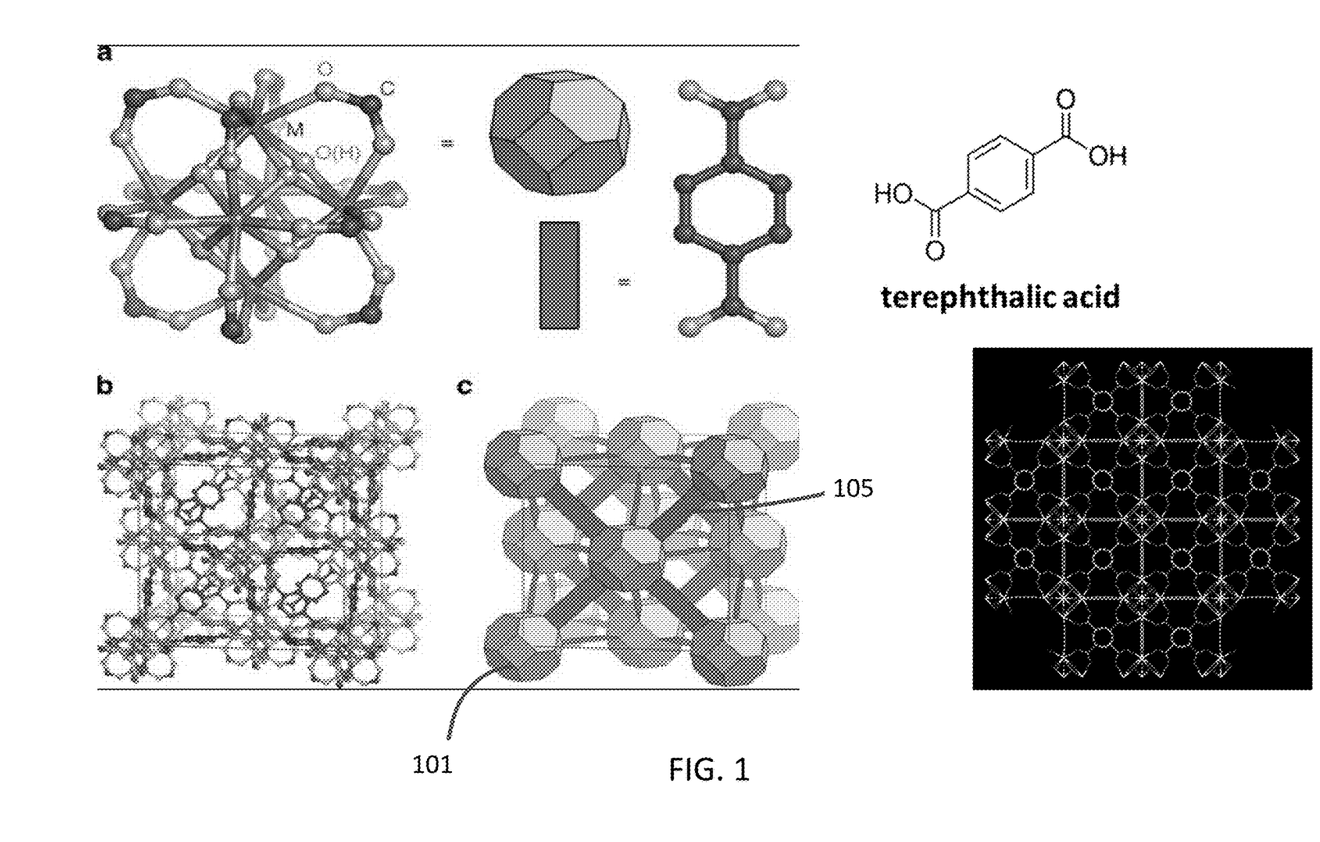
FIG. 1 illustrates representations of UiO-66 MOF in accordance with some embodiments of the invention.

FIG. 1 illustrates representations of UiO-66 MOF in accordance with some embodiments of the invention. The UiO-66 is built up from $Zr_6O_4(OH)4(CO_2)_{12}$ clusters 101 linked by terephthalate acid ligands 105, leading to a three-dimensional arrangement of micropores, in which each larger octahedral cage is surrounded by eight smaller tetrahedral cages. These two cages (8 and 11 Å in diameter, respectively) are connected through narrow windows of 6 Å in diameter. In some embodiments, solvothermal reactions can be used to prepare UiO-66 MOF materials. For example, in some embodiments, UiO-66 MOF synthesis can be carried out in a Teflon lined autoclave by mixing about 0.357 grams of $ZrCl_4$ and about 0.254 grams of terephthalic acid in about 21 mL of dimethylformamide (DMF) and about 8.6 mL of acetic acid. The mixture solution can be heated to about 120° C. for about 24 hours, and then cooled to room temperature yielding white colored crystals. The synthesized sample (comprising UiO-66 crystals) can be obtained by filtration, and dried in air for about 24 hours before use.

Figure 2:
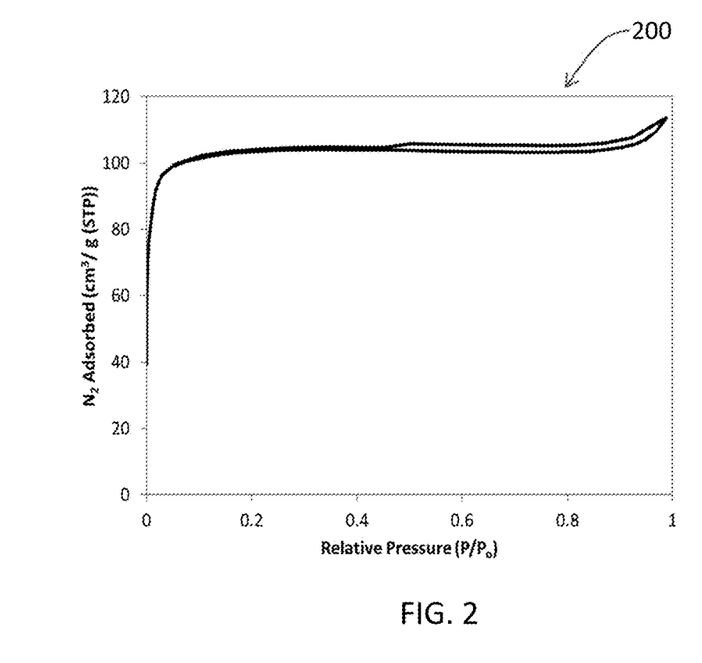
FIG. 2 illustrates the nitrogen isotherm at 77K of UiO-66 in accordance with some embodiments of the invention.
Figure 3:
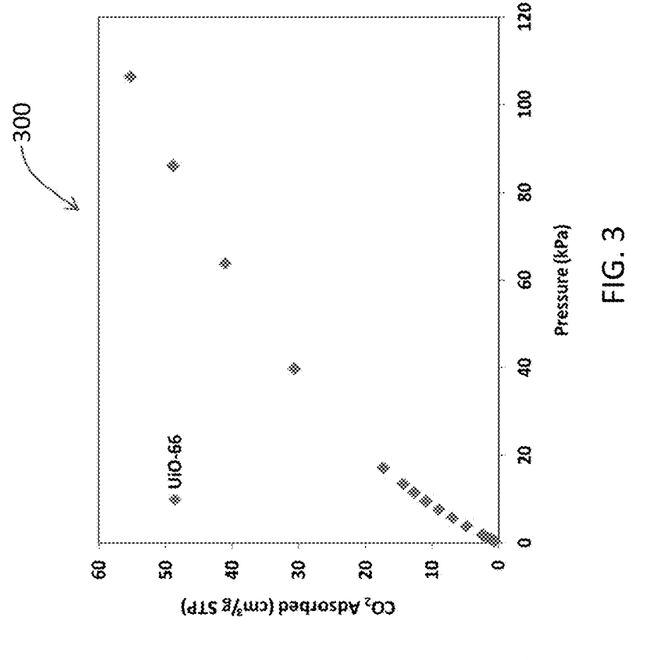
FIG. 3 illustrates the $CO_2$ capacity of UiO-66 in accordance with some embodiments of the invention.
Figure 4:
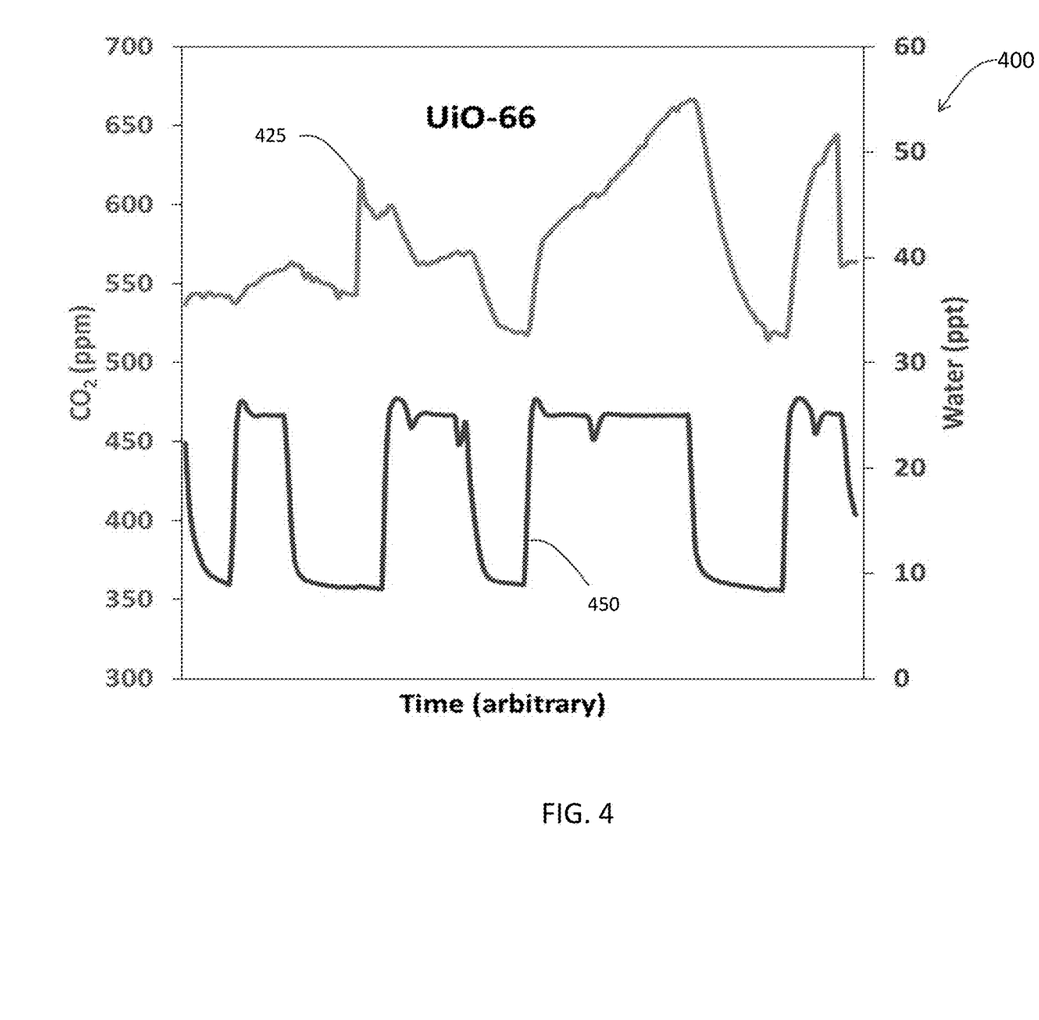
FIG. 4 illustrates data from a moisture swing adsorption test showed a swing of approximately 150 ppm $CO_2$ with a sample of approximately 100 mg UiO-66 when moisture switched between 5 and 25 parts per thousand in accordance with some embodiments of the invention.

Referring to FIG. 2, showing a graph 200 illustrating the nitrogen isotherm at UiO-66, and FIG. 3, showing graph 300 illustrating the $CO_2$ capacity of UiO-66 in accordance with some embodiments of the invention, the nitrogen isotherm at 77K of UiO-66, and has a BET surface area of 1188 $m^2/g$, which is in close agreement to the maximum values reported previously. In some embodiments of the invention, the $CO_2$ capacity is about 55 $cm^3/g$ at 100 kPa. FIG. 4 shows a graph 400 illustrating data from a moisture swing adsorption test showed a swing of approximately 150 ppm $CO_2$ with a sample of approximately 100 mg UiO-66 when moisture switched between 5 and 25 parts per thousand in accordance with some embodiments of the invention. For example, data line 425 shows the concentration of $CO_2$ as a function of time, while data line 450 shows water concentration in parts per thousand ("ppt").

Figures 5, 6:
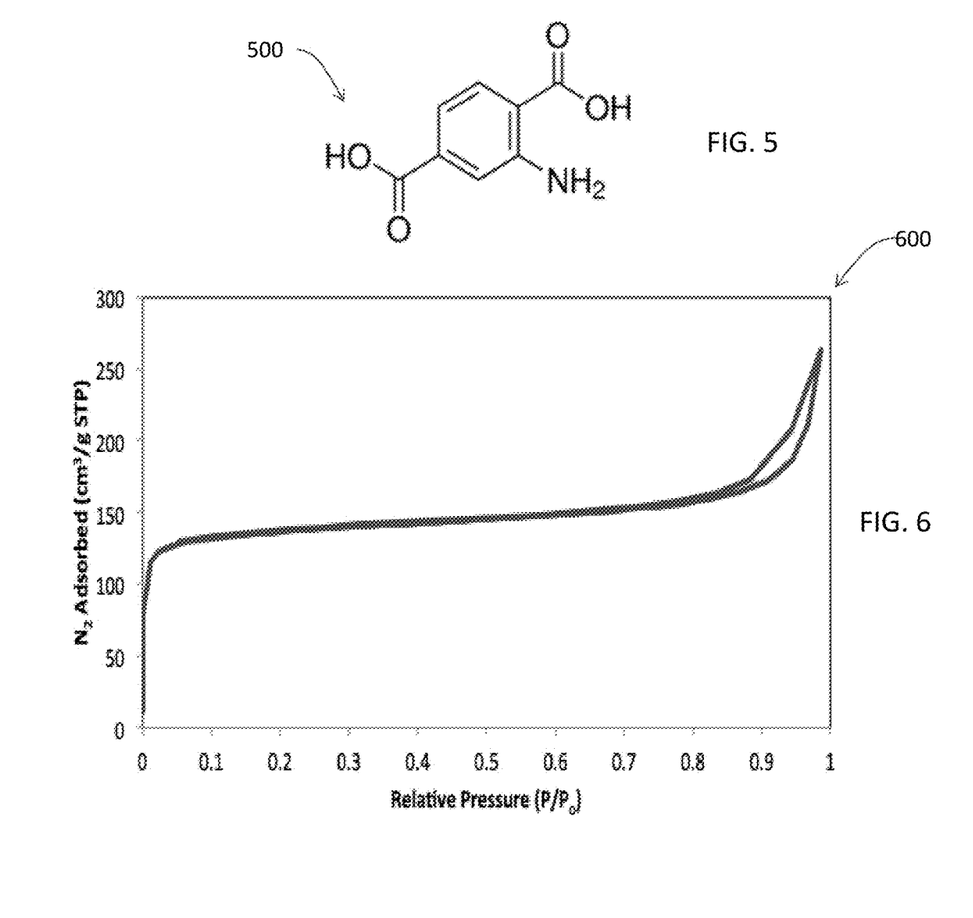
FIG. 5 illustrates a ligand structure of UiO-66-$NH_2$ MOF in accordance with some embodiments of the invention.
FIG. 6 illustrates the nitrogen isotherm at 77K of UiO-66-$NH_2$ in accordance with some embodiments of the invention

In some embodiments, the terephthalic acid ligand can be replaced with other ligands to produce additional MOF materials demonstrating positive moisture swing gas absorption. For example, in some embodiments, amino-terephthalic acid can be used to increase positive moisture swing behavior. In some embodiments, the amino-terephthalic acid can be used as the sole ligand molecule in the MOF, whereas in other embodiments, the amino-terephthalic acid can be used with one or more other ligands, including terephthalic acid. For example, FIG. 5 illustrates a ligand structure 500 of UiO-66-$NH_2$ MOF in accordance with some embodiments of the invention. In some embodiments, the UiO-66-$NH_2$ crystal structure is substantially identical to UiO-66 with an additional amine group on the terephthalic ligand.

Figure 7:
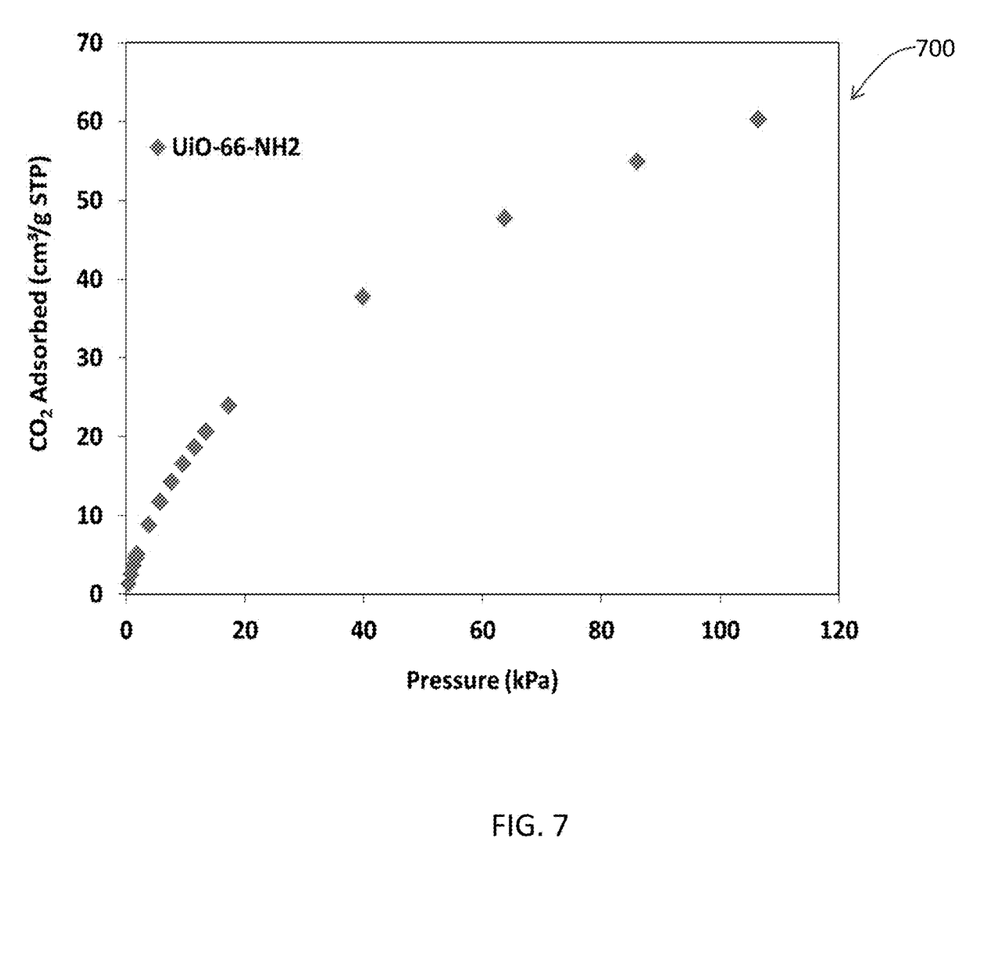
FIG. 7 illustrates the $CO_2$ capacity of UiO-66-$NH_2$ in accordance with some embodiments of the invention.
Figure 8:
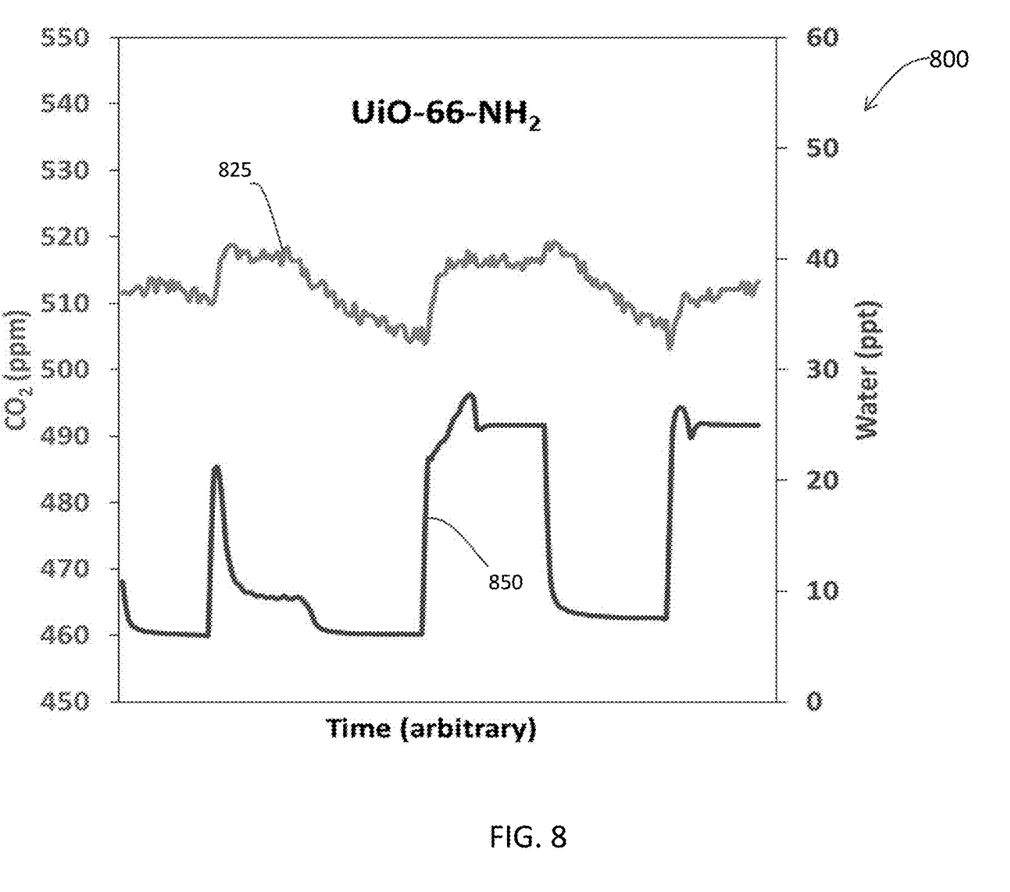
FIG. 8 illustrates data from a moisture swing adsorption test showed a swing of approximately 150 ppm $CO_2$ with a sample of approximately 100 mg UiO-66-$NH_2$ when moisture switched between 5 and 25 parts per thousand in accordance with some embodiments of the invention.

FIG. 6 shows a graph 600 illustrating the nitrogen isotherm at 77K of UiO-66-$NH_2$ in accordance with some embodiments of the invention, and FIG. 7 shows a graph 700 illustrating the $CO_2$ capacity of UiO-66-$NH_2$ in accordance with some embodiments of the invention. The nitrogen adsorption measurement of UiO-66-$NH_2$ shows a corresponding BET surface area of 539 $m^2/g$, and the $CO_2$ capacity is about 60 $cm^3/g$ at 100 kPa. FIG. 8 shows a graph 800 illustrating data from a moisture swing adsorption test showed a swing of UiO-66-$NH_2$ in accordance with some embodiments of the invention. The moisture swing adsorption test shows a swing of approximately 20 ppm $CO_2$ with a sample of approximately 100 mg UiO-66-$NH_2$ when moisture is switched between 5 and 25 ppt. For example, data line 825 shows the concentration of $CO_2$ as a function of time, while data line 850 shows water concentration in parts per thousand ("ppt").

Figures 9, 10:
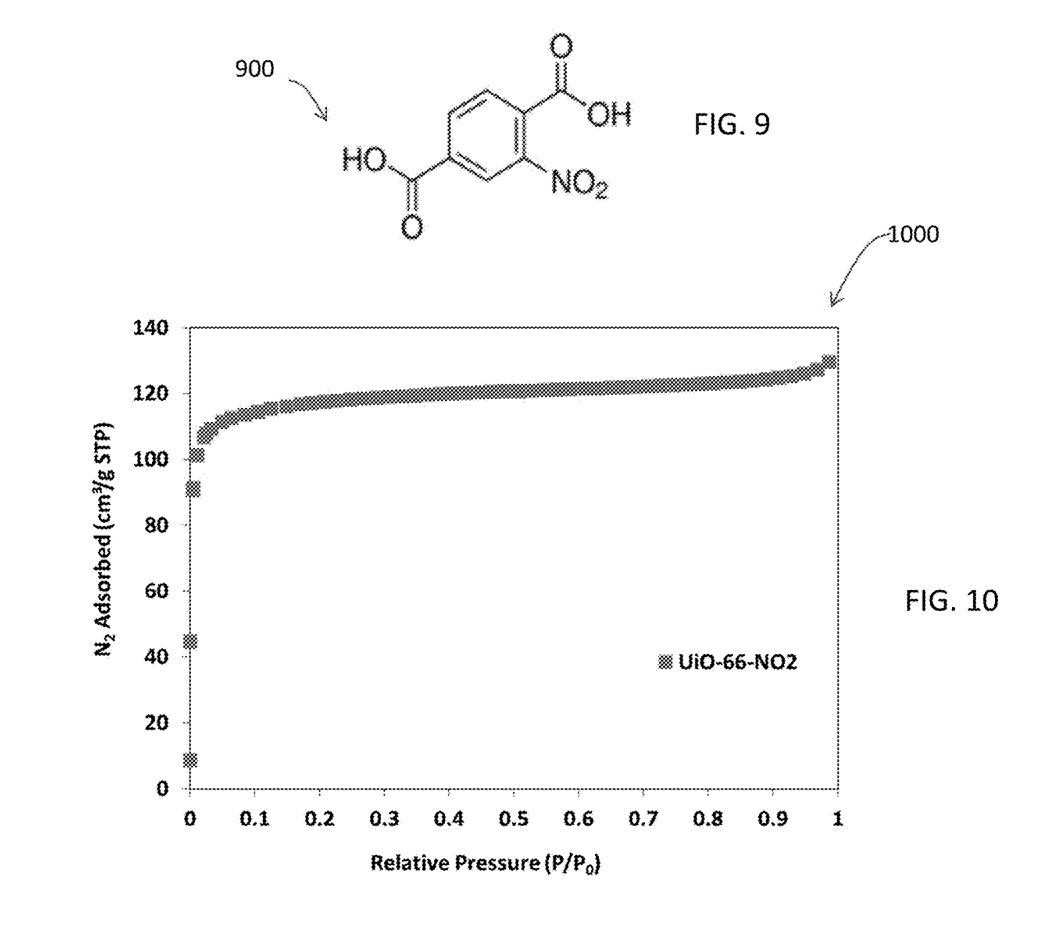
FIG. 9 illustrates a ligand structure of UiO-66-$NO_2$ MOF in accordance with some embodiments of the invention.
FIG. 10 illustrates the nitrogen isotherm at 77K of UiO-66-$NO_2$ in accordance with some embodiments of the invention

In some embodiments, the MOF ligand can be replaced with different ligands to produce additional MOF materials demonstrating positive moisture swing gas absorption. For example, in some embodiments, nitro-terephthalic acid can be used as a ligand in a MOF material demonstrating positive moisture swing behavior. In some embodiments, the nitro-terephthalic acid can be used as the sole ligand molecule in the MOF, whereas in other embodiments, the nitro-terephthalic acid can be used with one or more other ligands, including terephthalic acid and/or amino-terephthalic acid. For example, FIG. 9 illustrates a ligand structure 900 of UiO-66-$NO_2$ MOF in accordance with some embodiments of the invention. The UiO-66-$NO_2$ crystal structure is identical to UiO-66 with an additional nitro group on the terephthalic ligand.

Figure 11:
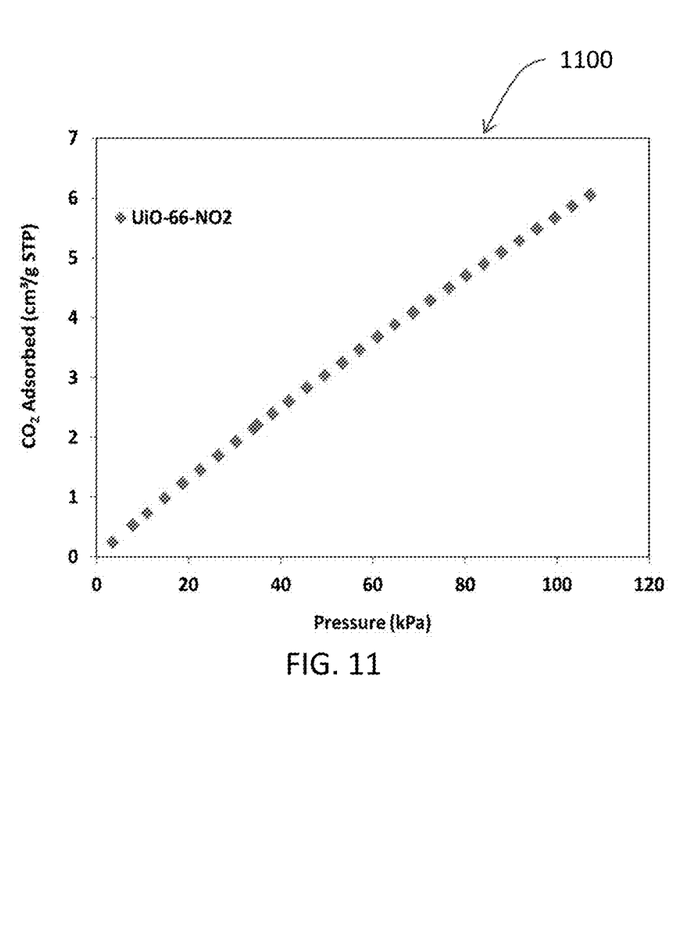
FIG. 11 illustrates the $CO_2$ capacity of UiO-66-$NO_2$ in accordance with some embodiments of the invention.
Figure 12:
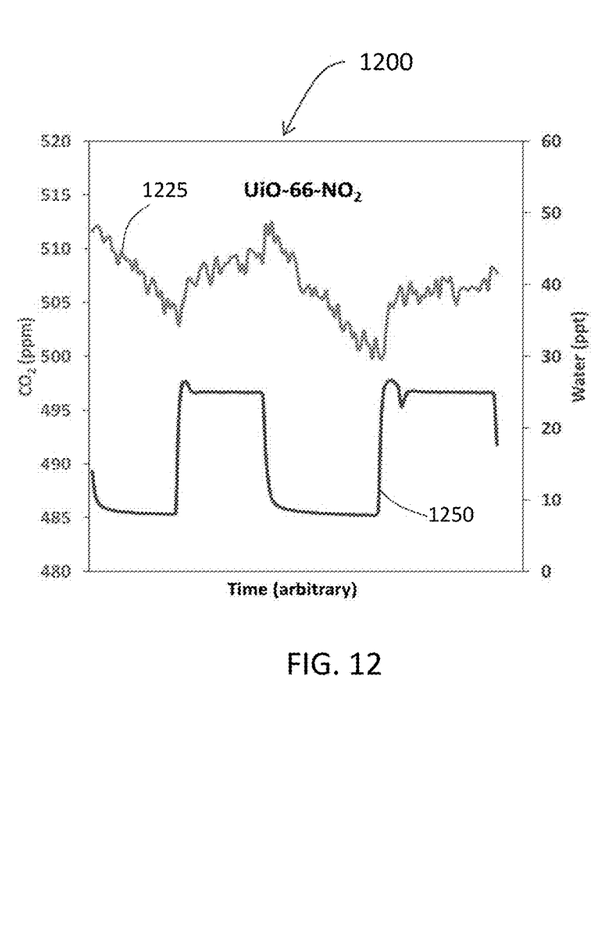
FIG. 12 illustrates data from a moisture swing adsorption test showed a swing of approximately 150 ppm $CO_2$ with a sample of approximately 100 mg UiO-66-$NO_2$ when moisture switched between 5 and 25 parts per thousand in accordance with some embodiments of the invention.

FIG. 10 shows a graph 1000 illustrating the nitrogen isotherm at 77K of UiO-66-$NO_2$ in accordance with some embodiments of the invention, and FIG. 11 shows a graph 1100 illustrating the $CO_2$ capacity of UiO-66-$NO_2$ in accordance with some embodiments of the invention. The nitrogen adsorption measurement of UiO-66-$NO_2$ shows a corresponding BET surface area of 470 $m^2/g$, and the $CO_2$ capacity is about 6 $cm^3/g$ at 100 kPa. FIG. 12 shows a graph 1200 illustrating data from a moisture swing adsorption test of UiO-66-$NO_2$ in accordance with some embodiments of the invention. The moisture swing adsorption shows a swing of approximately 12 ppm $CO_2$ with a sample of approximately 100 mg UiO-66-$NO_2$ when moisture switched between 5 and 25 parts per thousand (ppt). For example, data line 1225 shows the concentration of $CO_2$ as a function of time, while data line 1250 shows water concentration in parts per thousand ("ppt").

Figure 13:
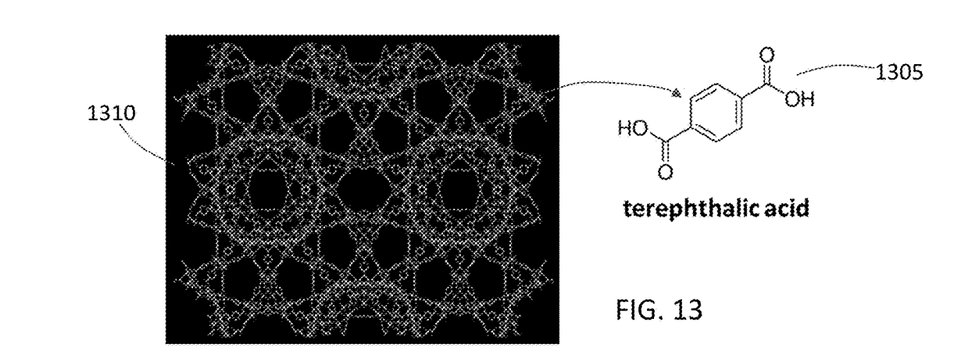
FIG. 13 illustrates a ligand structure of MIL-101(Cr) MOF in accordance with some embodiments of the invention.

In some embodiments, the invention includes materials and methods related to any MOF materials using one or more alternative metal ions or metal ion clusters comprising a metal atom. For example, in some embodiments, the invention relates to any MOF matrices including Chromium. For example, chromium (III) terephthalate (MIL-101) can be a positive moisture swing gas absorption material in some embodiments. FIG. 13 illustrates a ligand structure of MIL-101(Cr) MOF in accordance with some embodiments of the invention. MIL-101(Cr) is built up from corner-sharing tetrahedrons, each of which is made from the self-assembly of Cr—O inorganic trimers and terephthalate acid ligands (structure 1305) forming a porous framework (structure 1310) with one type of micropore and two types of mesopores. The micropore has 8.6 Å free aperture for the windows and two mesopores have an internal free diameter of 29 and 34 Å, respectively.

Figure 14:
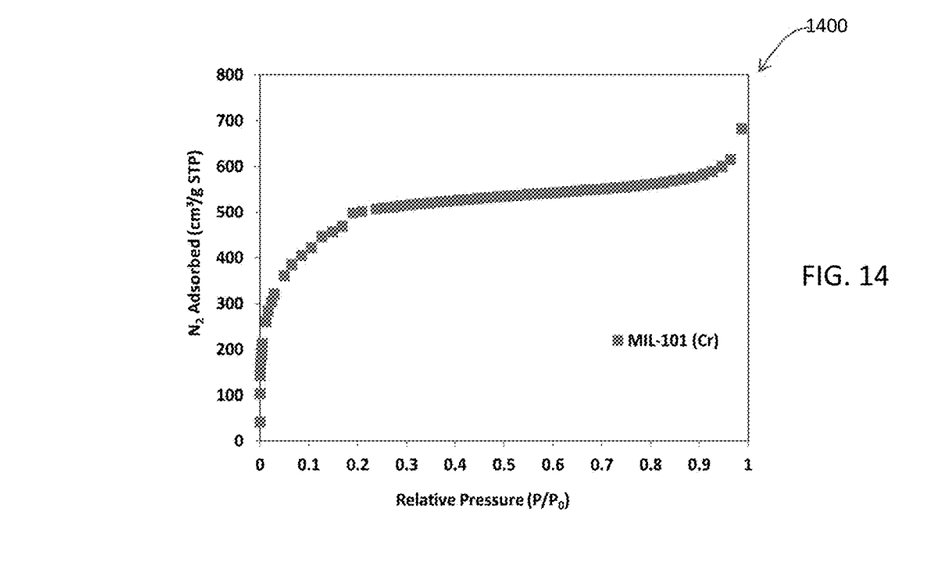
FIG. 14 illustrates the nitrogen isotherm at 77K of MIL-101(Cr) MOF in accordance with some embodiments of the invention
Figure 15:
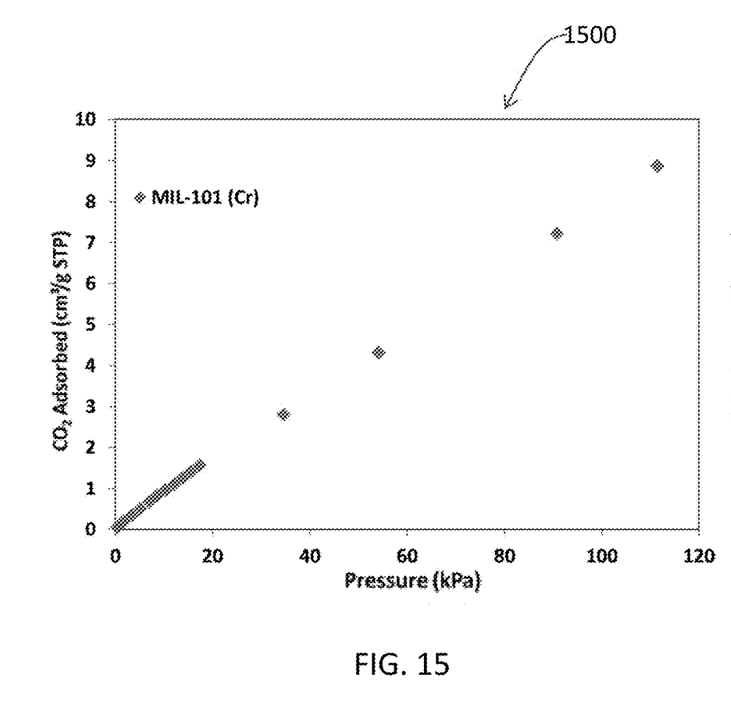
FIG. 15 illustrates the $CO_2$ capacity of MIL-101(Cr) MOF in accordance with some embodiments of the invention.
Figure 16:
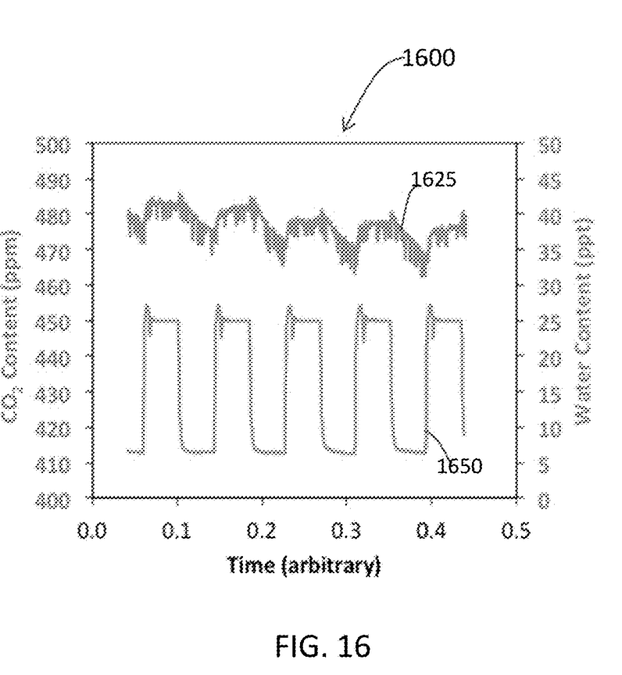
FIG. 16 illustrates data from a moisture swing adsorption test showed a swing of approximately 150 ppm $CO_2$ with a sample of approximately 100 mg MIL-101(Cr) MOF when moisture switched between 5 and 25 parts per thousand in accordance with some embodiments of the invention.

FIG. 14 shows a graph 1400 illustrating the nitrogen isotherm at 77K of MIL-101(Cr) MOF in accordance with some embodiments of the invention, and FIG. 15 shows a graph 1500 illustrating the $CO_2$ capacity of MIL-101(Cr) MOF in accordance with some embodiments of the invention. The nitrogen adsorption measurement of MIL-101(Cr) shows a corresponding BET surface area of 1748 $m^2/g$, and the $CO_2$ capacity is only about 8 $cm^3/g$ at 100 kPa. FIG. 16 shows a graph 1600 illustrating data from a moisture swing adsorption test of MIL-101(Cr) MOF in accordance with some embodiments of the invention. The moisture swing adsorption test shows a swing of approximately 10 ppm $CO_2$ with a sample of approximately 100 mg MIL-101(Cr) when moisture switched between 5 and 25 ppt.

Figure 17:
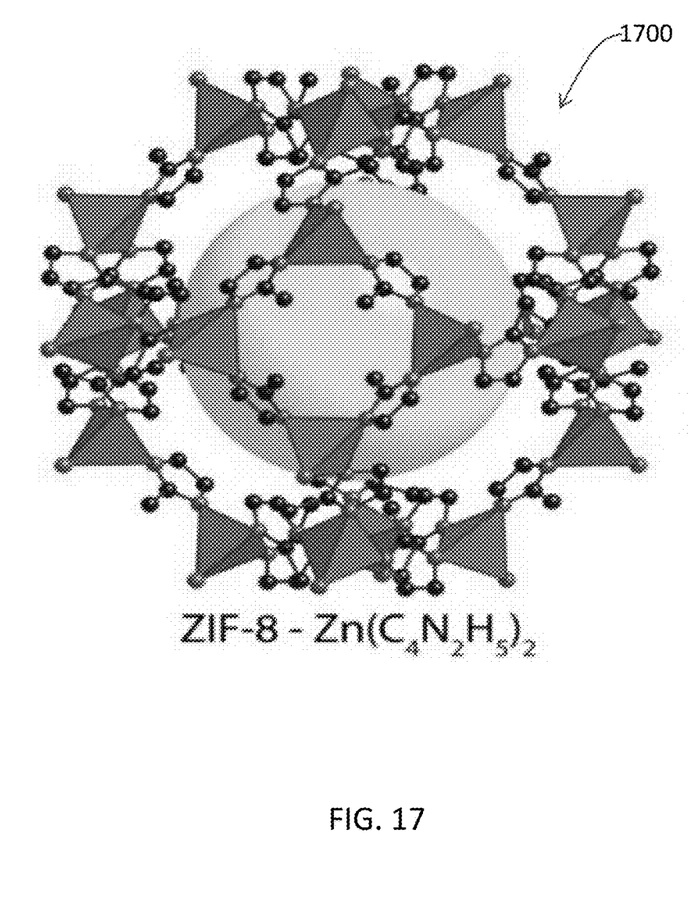
FIG. 17 illustrates a ligand structure of ZIF-8 MOF in accordance with some embodiments of the invention.
Figure 18:
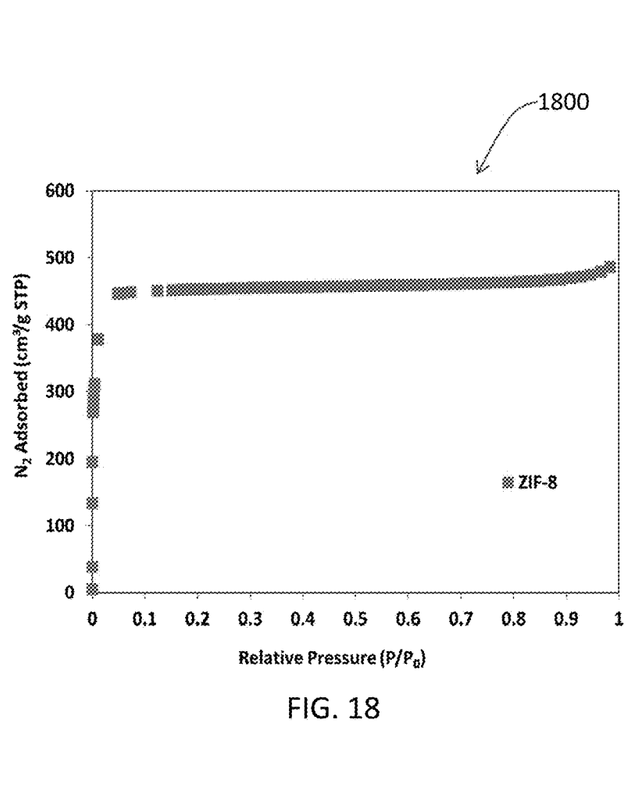
FIG. 18 illustrates the nitrogen isotherm of ZIF-8 MOF in accordance with some embodiments of the invention.
Figure 19:
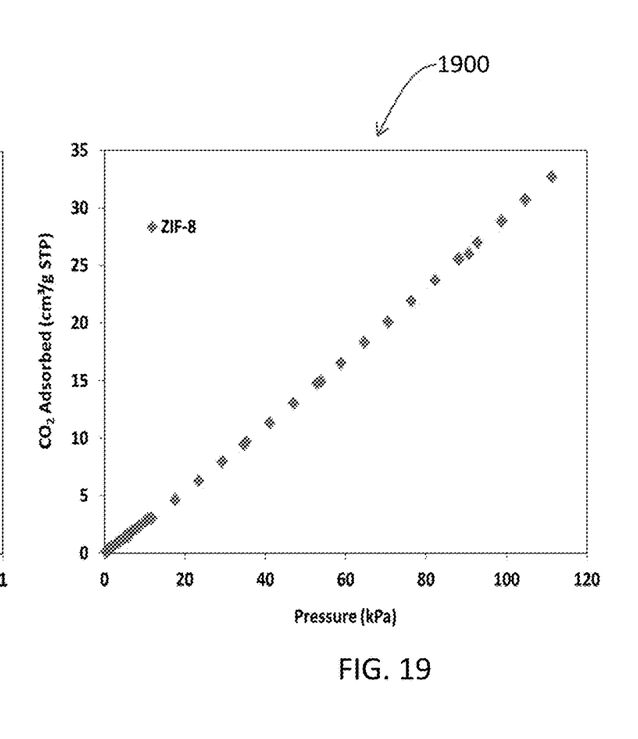
FIG. 19 illustrates the $CO_2$ capacity of ZIF-8 MOF in accordance with some embodiments of the invention.

Other MOF materials can show varying levels of gas absortion and desorption. For example, ZIF-8 (a zeolitic imidazolate), which is a MOF formed by zinc ions coordinated by four imidazolate rings was tested for $CO_2$ absorption and desorption. FIG. 17 illustrates a ligand structure 1700 of ZIF-8 MOF, and FIG. 18 shows a graph 1800 that illustrates the nitrogen isotherm of ZIF-8 MOF. The nitrogen adsorption measurement of ZIF-8 shows a corresponding BET surface area of 1693 $m^2/g$, and the $CO_2$ capacity is about 30 $cm^3/g$ at 100 kPa (shown in graph 1900 of FIG. 19, illustrating the $CO_2$ capacity of ZIF-8 MOF.)

Figure 20:
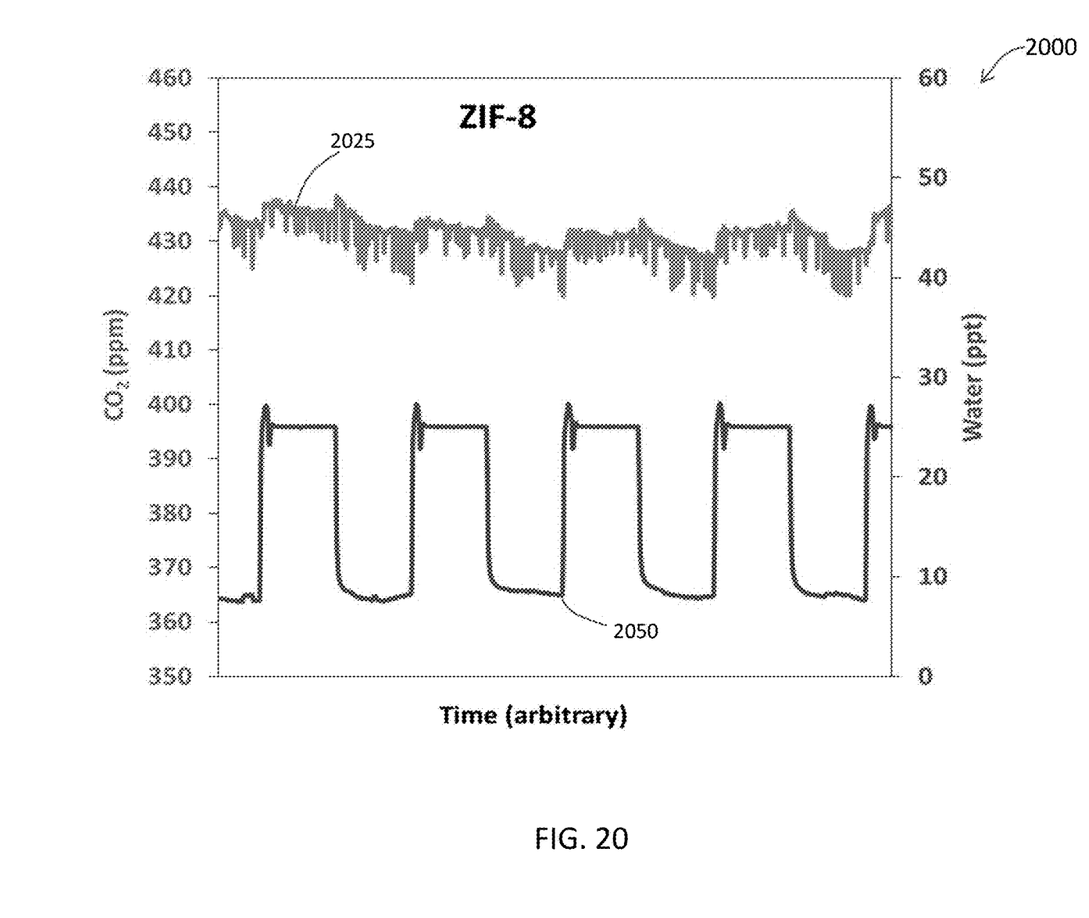
FIG. 20 illustrates data from a moisture swing adsorption test of ZIF-8 MOF in accordance with some embodiments of the invention.

FIG. 20 shows a graph 2000 illustrating data from a moisture swing adsorption test showing a swing of ZIF-8 MOF. In comparison with embodiments of the invention described herein, the moisture swing adsorption test showed a negligible swing capacity in 100 mg ZIF-8 when moisture switched between 5 and 25 ppt. For example, data line 2025 shows the concentration of $CO_2$ as a function of time, while data line 2050 shows water concentration in parts per thousand ("ppt").

The invention claimed is:

1. A carbon dioxide capture and release method comprising:
   forming a metal-organic framework (MOF) matrix material including at least one metal-organic-framework crystal, the at least one metal-organic-framework crystal comprising at least one metal ion or metal ion cluster coordinated to polydentate organic ligands; and
   forming a positive moisture swing $CO_2$ host by application of at least a portion of the MOF matrix material to at least a portion of a good;
   exposing the good to a feed gas, wherein the feed gas is ambient air; and
   altering the absorption and desorption of $CO_2$ in the $CO_2$ host through a swing absorption/desorption process of moisture content; and
   wherein an equilibrium pressure of $CO_2$ over the $CO_2$ host is based at least in part on the moisture content.

2. The method of claim 1, wherein the swing absorption/desorption process comprises altering the moisture content of the $CO_2$ host.

3. The method of claim 1, wherein the moisture content is altered based on a moisture content of the feed gas.

4. The method of claim 1, wherein a positive moisture swing comprises an increase in moisture in the $CO_2$ host and a related increase in $CO_2$ absorption by the $CO_2$ host.

5. The method of claim 1, wherein the at least one metal-organic-framework crystal comprises UIO-66.

6. The method claim 5, wherein the UIO-66 comprises $Zr_6O_4(OH)_4(CO_2)_{12}$ clusters linked by terephthalate acid ligands.

7. The method claim 5, wherein the UIO-66 comprises $Zr_6O_4(OH)_4(CO_2)_{12}$ clusters linked by amino-terephthalic acid ligands.

8. The method claim 5, wherein the UIO-66 comprises $Zr_6O_4(OH)_4(CO_2)_{12}$ clusters linked by nitro-terephthalic acid ligands.

9. The method of claim 1, wherein the polydentate organic ligand includes at least one of terephthalate acid, amino-terephthalic acid, and nitro-terephthalic acid.

10. The method of claim 1, wherein the MOF matrix material comprises chromium (III) terephthalate.

11. The method of claim 1, wherein the MOF matrix material comprises a zeolitic imidazolate framework comprising ZIF-8.

12. The method of claim 1, wherein the good comprises glass, glass-ceramic, or ceramic oxide bead or particle.

13. The method of claim 12, wherein ceramic oxide is alumina.

14. The method of claim 1, wherein the good comprises a gas separation or storage tube or cylinder.

15. The method of claim 14, wherein the gas separation or storage tube or cylinder includes the MOF matrix material.

16. The method of claim 1, wherein the MOF matrix material is formed from a mixture of $ZrCl_4$ and terephthalic acid in dimethylformamide and acetic acid heated to 120° C. for 24 hours.

17. The method of claim 5, wherein the equilibrium pressure of $CO_2$ is based on the polydentate organic ligand.

18. The method of claim 5, wherein the polydentate organic ligand includes terephthalate acid, and at least one of amino-terephthalic acid, and nitro-terephthalic acid, and
   wherein the equilibrium pressure of $CO_2$ over the $CO_2$ host is based on the relative proportions of terephthalate acid, amino-terephthalic acid, and nitro-terephthalic acid.

19. The method of claim 1, wherein the application comprises depositing the MOF matrix material on or in at least a portion of the good.

* * * * *